(12) United States Patent
Reimer

(10) Patent No.: US 9,133,937 B1
(45) Date of Patent: Sep. 15, 2015

(54) HEAVY-DUTY SHAFT SEAL

(71) Applicant: Engineered Seal Products, Inc., Cedar Rapids, IA (US)

(72) Inventor: Mark Reimer, Coralville, IA (US)

(73) Assignee: Engineered Seal Products, Inc., Cedar Rapids, IA (US)

( * ) Notice: Subject to any disclaimer, the term of this patent is extended or adjusted under 35 U.S.C. 154(b) by 14 days.

(21) Appl. No.: 14/220,334

(22) Filed: Mar. 20, 2014

(51) Int. Cl.
*F16J 15/32* (2006.01)

(52) U.S. Cl.
CPC .......... *F16J 15/3232* (2013.01); *F16J 15/3204* (2013.01)

(58) Field of Classification Search
CPC ..... F16J 15/32; F16J 15/3248; F16J 15/3252; F16J 15/3256
USPC .......................... 277/549, 562, 568, 571, 572
See application file for complete search history.

(56) References Cited

U.S. PATENT DOCUMENTS

| | | | |
|---|---|---|---|
| 5,975,534 A * | 11/1999 | Tajima et al. | 277/353 |
| 6,450,503 B1 * | 9/2002 | Dossena et al. | 277/572 |
| 6,817,769 B2 * | 11/2004 | Johnson et al. | 384/478 |
| 7,108,267 B2 * | 9/2006 | Oldenburg | 277/571 |
| 8,474,825 B2 * | 7/2013 | Nakagawa | 277/353 |
| 8,573,601 B2 * | 11/2013 | Nakagawa | 277/551 |
| 2003/0189297 A1 * | 10/2003 | Chen | 277/549 |
| 2006/0012129 A1 * | 1/2006 | Oldenburg | 277/572 |

* cited by examiner

*Primary Examiner* — Gilbert Lee
(74) *Attorney, Agent, or Firm* — Jason R. Sytsma; Shuttleworth & Ingersoll, PLC

(57) ABSTRACT

A seal has a casing having an outer-diameter surface, an interior facing surface, an exterior facing surface, and a chamfered surface between the exterior facing surface and the outer-diameter surface. A sleeve assembly is positioned radially inward from the casing, and has at least one dust lip that engages an interior side of the chamfered surface for blocking debris from the interior facing surface of the seal. A primary sealing body is positioned radially inward from the casing for blocking debris from the interior facing surface of the casing. The sleeve assembly rotates either with the casing or with respect to the casing.

23 Claims, 4 Drawing Sheets

HEAVY-DUTY SHAFT SEAL

BACKGROUND OF THE INVENTION

The present disclosure relates generally to shaft seals, and more specifically, to a heavy-duty shaft seal for preventing the loss of fluid and preventing ingress of contaminants around a rotating shaft.

Most vehicles include rotary shafts that are at least partially received in and rotate relative to a stationary housing. Examples of such arrangements are found in conventional transmissions and axle assemblies. It is necessary to provide a seal at the interface between the shaft and the housing. Sealing the interface is necessary because under many operating conditions, especially in dirty or muddy environments, large amounts of contaminants are present that could enter into the interface between the shaft and the housing and cause eventual problems. Conventional sealing arrangements typically include a rubber lip seal to prevent contaminants from entering into the system. Additional rubber lip seals are used to keep lubricant from exiting the system.

There are several problems with conventional rubber lip seals. First, rubber lip seals tend to wear out in an undesirable fashion. The rotary shafts on most heavy duty equipment rotate at very high speeds and the constant contact between the rotating shaft and the rubber lip seal causes the seal to wear. Furthermore, the presence of contaminants along the contact area between the shaft and the rubber lip seal often cause significant wear on the seal, which results in short seal life. This problem is especially pronounced in heavy equipment that operates in muddy environments.

A need exists for a less-expensive longer lasting rotary shaft seal.

SUMMARY

A seal has a casing having an outer-diameter surface, an interior facing surface, an exterior facing surface, and a chamfered surface between the exterior facing surface and the outer-diameter surface. A sleeve assembly is positioned radially inward from the casing, and has at least one dust lip that engages an interior side of the chamfered surface for blocking debris from the interior facing surface of the seal. A primary sealing body is positioned radially inward from the casing for blocking debris from the interior facing surface of the casing. The sleeve assembly rotates either with the casing or with respect to the casing.

Various other objects, features and attendant advantages of the present invention will become fully appreciated as the same becomes better understood when considered in conjunction with the accompanying drawings, in which like reference characters designate the same or similar parts throughout the several views.

DETAILED DESCRIPTION

Figure 1:
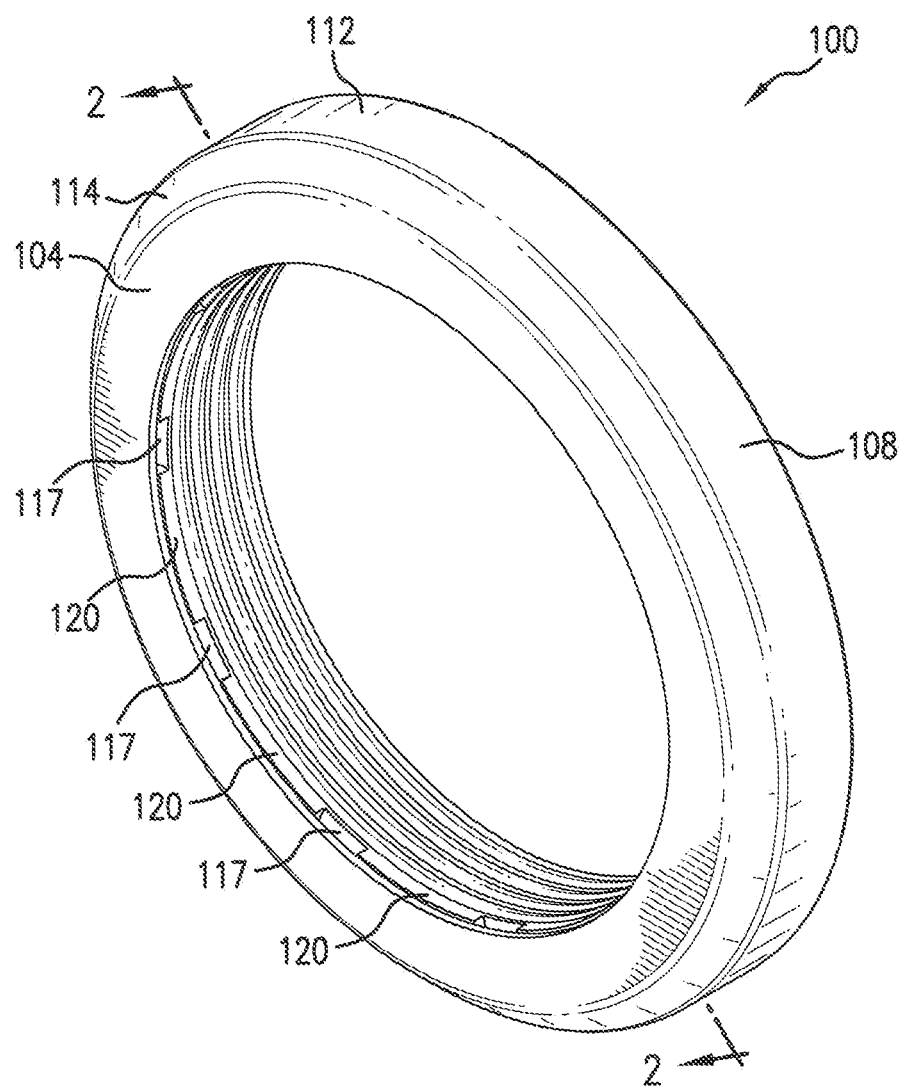
FIG. 1 is a perspective view of a shaft seal shown from the exterior facing side.
Figure 2:
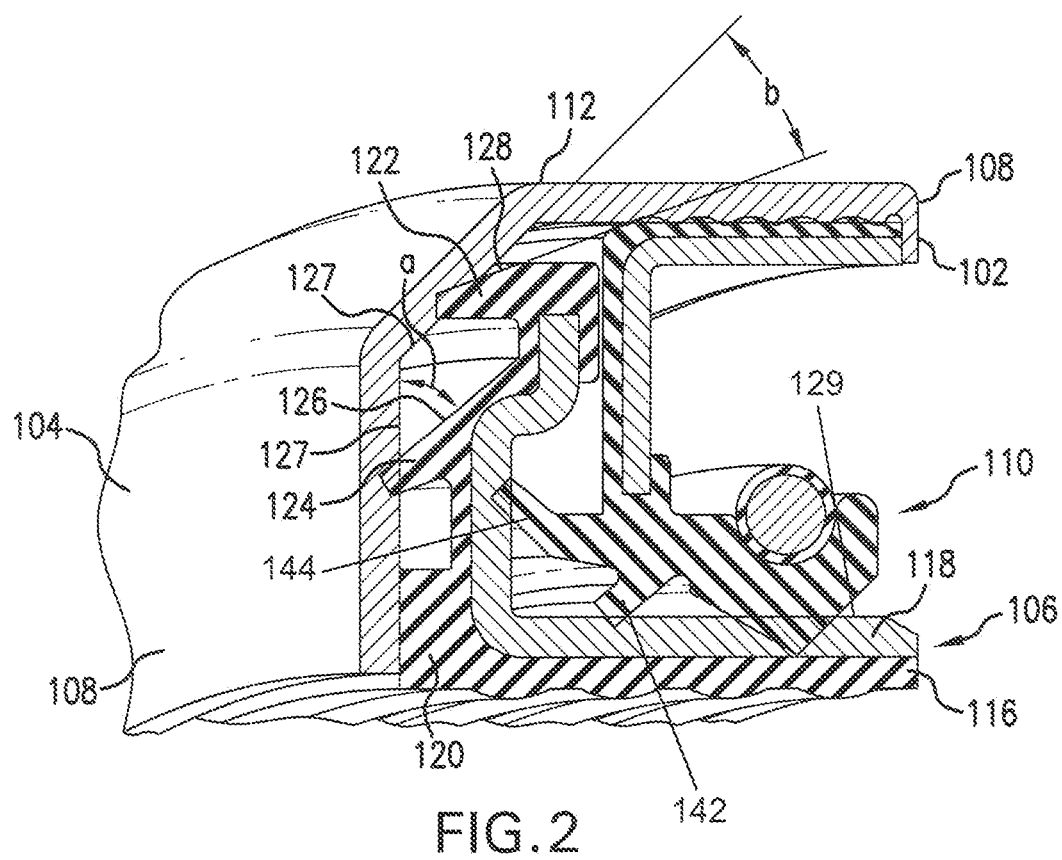
FIG. 2 is a cross-sectional view of the shaft seal of FIG. 1.

FIGS. 1 and 2 show a heavy-duty shaft seal 100 for a housing bore into which shaft seal 100 is installed. Shaft seal 100 has a casing 108 bounded by an interior-facing sides 102, an exterior facing surface 104, and a sleeve 116 of a sleeve assembly 106. Once installed, shaft seal 100 includes three primary sealing surfaces. The first sealing surface is a tight static seal formed from an interference fit between an outer diameter of casing 108 of shaft seal 100 and the housing bore. The outer diameter of casing 108 of shaft seal 100 is slightly larger than the bore to ensure a tight press fit that prevents leakage around casing 108, which also keeps shaft seal 100 retained in the bore.

The second sealing surface is formed between an inner diameter of sleeve assembly 106 and the rotating shaft. The inner diameter of sleeve 116 of sleeve assembly 106 is slightly smaller than the rotating shaft to ensure a tight press fit that prevents leakage around sleeve 116. Sleeve assembly 106 then rotates with the rotating shaft with respect to the remaining portions of shaft seal 100. Sleeve 116 is made from a polymeric material to provide a tight leak resistant frictional fit on the rotating shaft; however, sleeve can also be engaged with the shaft via an adhesive, bonding material or other engaging mechanism. The third sealing surface is a dynamic sealing surface between one or more elastomeric lips made from an elastomeric material against casing 108 or sleeve assembly 106, which is described in more detail below.

Shaft seal 100 comprises, generally, of casing 108, primary sealing body 110, and sleeve assembly 106. Casing 108 in an annular-shaped metal can with an outer diameter slightly larger than the bore to ensure a tight press fit that prevents leakage around casing 108. Casing 108 has a substantially forty-five degree)(45° chamfer 114 between exterior facing surface 104 and outer-diameter surface 112. Chamfer 114 positions a chamfered surface 119, which is a portion of an interior side 127 of casing 108, closer to sleeve assembly 106 for reasons discuss below. Chamfer 114 and chamfered surface 119 can be any angle between eighty degrees (80°) and five degrees (5°).

Sleeve assembly 106 includes, generally, sleeve 116 made from an elastomeric material bonded to a rigid member 118 for strength and resilience. Sleeve 116 is slightly smaller than the rotating shaft to ensure a tight frictional fit to prevent leakage around sleeve 116, and allow sleeve assembly 106 to rotate with the rotating shaft. Sleeve 116 includes a series of circumferentially spaced wedges 120 to seal sleeve 116 to casing 108. Spaces 117 (shown in FIG. 1) are left between wedges 120 to reduce the friction of sleeve assembly 106 against casing 108. Sleeve 116 also includes one or more dust lips 122 and 124 made from an elastomeric material, which function as a first line of defense to keep dirt and debris away from the interior facing side.

Each dust lip 122 and 124 has an exclusion angle defined by the angle of each dust lip 122 and 124 is positioned in relation to the surface that each dust lip 122 and 124 engages, i.e. interior side 127 of casing 108. Dust lip 124 has a first surface 126 that engages interior side 127 at an exclusion angle "a." Dust lip 122 has a first surface 128 that engages chamfered surface 119 of chamfer 114 of interior side 127 at an exclusion angle "b." Exclusion angle "a" and exclusion angle "b" are substantially the same or within a plus or minus thirty degree (30°) difference. In the illustrated embodiment, exclusion angle "a" and exclusion angle "b" are twenty-five degrees (25°); however the exclusion angle can be any angle from zero degrees (0°) to ninety degrees (90°).

Figure 4:
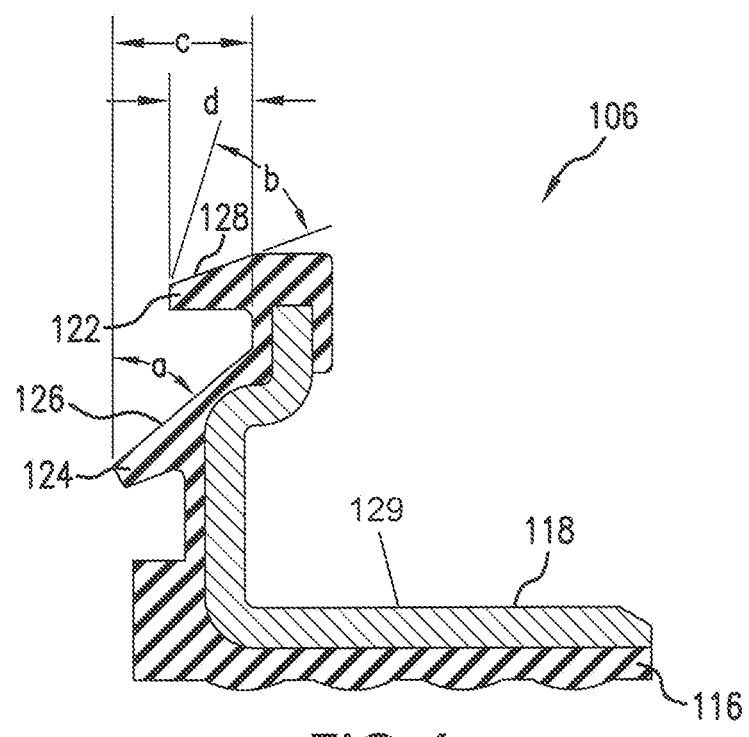
FIG. 4 is a cross-sectional view of the sleeve assembly of the shaft seal of FIG. 1.

Chamfer 114 of casing 108 positions chamfered surface 119 of interior side 127 closer to sleeve 116 of seal assembly 106. Referring to FIG. 4, this enables dust lip 122 to have a shorter length "d" than the length "c" of dust lip 124 while maintaining the same exclusion angle, which makes dust lip 122 more rigid and resilient than dust lip 124, and better able to keep dirt and debris from entering the interior facing side 102 of shaft seal 100. In the illustrated embodiment, length "d" is two inches (2") and length "c" is three and one-half inches (3.5"), although these dimensions can change depending upon the size of shaft seal 100.

Figure 3:
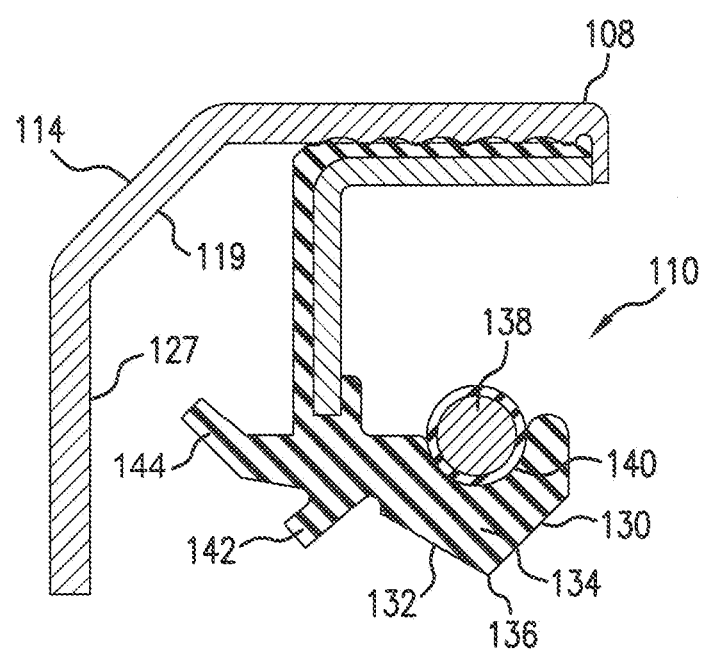
FIG. 3 is a cross-sectional view of the casing and primary sealing body from the shaft seal of FIG. 1.

FIGS. 2 and 3 show primary sealing body 110. Primary sealing body 110 has a primary sealing lip 134 that engages a smooth surface 129 of rigid member 118 of seal assembly 106 to keep dirt and debris out of the interior facing side of shaft seal 100. Primary sealing lip 134 has a radially inwardly facing surface with a high angle area 130 at about a forty-five degree (45°) (measured with respect to surface 129) and a low angle area 132 at about a thirty degree (30°) (measured with respect to surface 129) to form a primary sealing contact line 136 (the respective angles can be plus or minus three degrees (3°) or any range therebetween). The steeper angle in high-angle area 130 creates a greater pressure gradient on the exterior facing side of shaft seal 100 that keeps lubricant from leaking around primary sealing lip 134. Primary sealing lip 134 is urged into engagement against smooth surface 129 of sleeve assembly 106 by a spring 138 positioned in spring-receiving recess 140.

Primary sealing body 110 can have one or more secondary dust lips. The illustrated embodiment includes two dust lips 142 and 144 that engage smooth surface 129 of sleeve assembly 106. Dust lips 142 and 144 are further barriers against environmental debris entering the interior-facing side of shaft seal 100. More or less dust lips can be added to fit the application.

In one embodiment, sleeve assembly 106 is rotatable with the rotating shaft, and primary sealing body 110 is stationary. Other configurations in other applications are possible, of course, for example, sleeve assembly 106 can be stationary and primary sealing body 110 may be rotatable with the rotating shaft.

To those skilled in the art to which this invention relates, many changes in construction and widely differing embodiments and applications of the invention can suggest themselves without departing from the spirit and scope of the invention. The disclosures and the descriptions herein are purely illustrative and are not intended to be in any sense limiting. Various aspects of the different embodiments can be combined in different combinations to create new embodiments within the scope of the invention.

What is claimed is:

1. A seal comprising:
a casing having an outer-diameter wall that forms an outer radial portion of the casing and an exterior facing wall that forms an axially outermost exterior portion of the casing, the outer-diameter wall having an interior surface, the exterior facing wall having an interior surface, and a chamfered surface between the interior surface of the outer-diameter wall and the interior surface of the exterior facing wall;
a sleeve assembly positioned radially inward from the casing for rotating with respect to the casing; and
the sleeve assembly having at least one dust lip that engages the chamfered surface for blocking debris.

2. The seal of claim 1, and further comprising a second dust lip combined to the sleeve assembly that engages the interior surface of the exterior facing wall.

3. The seal of claim 2, wherein the dust lip that engages the chamfered surface has an exclusion angle substantially equivalent to the exclusion angle of the second dust lip that engages the interior surface of the exterior facing wall.

4. The seal of claim 3, wherein the interior surface of the exterior facing wall is substantially vertical, and the chamfered surface is at a substantially forty-five degree (45°) angle with respect to the interior surface of the exterior facing wall.

5. The seal of claim 3, wherein the exclusion angle of the dust lip that engages the chamfered surface is substantially twenty-five degrees (25°).

6. The seal of claim 3, wherein a length of the dust lip that engages the chamfered surface is shorter than a length of the second dust lip that engages the interior surface of the exterior facing wall.

7. The seal of claim 3, wherein the interior surface of the exterior facing wall is substantially vertical, and the chamfered surface is at a substantially forty-five degree (45°) angle with respect to the interior surface of the exterior facing wall, wherein the exclusion angle of the dust lip that engages the chamfered surface is substantially twenty-five degrees (25°), and wherein a length of the dust lip that engages the chamfered surface is shorter than a length of the second dust lip that engages the interior surface of the exterior facing wall, and further comprising a rigid member combined to the sleeve assembly at least partially surrounded by an elastomeric material, the elastomeric material including the at least one dust lip and the second dust lip.

8. The seal of claim 7, and further comprising a primary sealing lip engaging the rigid member for blocking debris and rotating with respect to the rigid member.

9. A seal comprising:
a casing having an outer-diameter wall that forms an outer radial portion of the casing and an exterior facing wall that forms an axially outermost exterior portion of the casing, the outer-diameter wall having an interior surface, the exterior facing wall having an interior surface, and a chamfered surface between the interior surface of the outer-diameter wall and the interior surface of the exterior facing wall;
a sleeve assembly positioned radially inward from the casing for rotating with the casing; and
the sleeve assembly having at least one dust lip that engages the chamfered surface for blocking debris.

10. The seal of claim 9, and further comprising a second dust lip combined to the sleeve assembly that engages the interior surface of the exterior facing wall.

11. The seal of claim 10, wherein the dust lip that engages the chamfered surface has an exclusion angle substantially equivalent to the exclusion angle of the second dust lip that engages the interior surface of the exterior facing wall.

12. The seal of claim 11, wherein the interior surface of the exterior facing wall is substantially vertical, and the chamfered surface is at a substantially forty-five degree (45°) angle with respect to the interior surface of the exterior facing wall.

13. The seal of claim 11, wherein the exclusion angle of the dust lip that engages the chamfered surface is substantially twenty-five degrees (25°).

14. The seal of claim 11, wherein a length of the dust lip that engages the chamfered surface is shorter than a length of the second dust lip that engages the interior surface of the exterior facing wall.

15. The seal of claim 11, wherein the interior surface of the exterior facing wall is substantially vertical, and the chamfered surface is at a substantially forty-five degree (45°) angle with respect to the interior surface of the exterior facing wall, wherein the exclusion angle of the dust lip that engages the chamfered surface is substantially twenty-five degrees (25°), and wherein a length of the dust lip that engages the chamfered surface is shorter than a length of the second dust lip that engages the interior surface of the exterior facing wall, and further comprising a rigid member combined to the sleeve assembly at least partially surrounded by an elastomeric material, the elastomeric material including the at least one dust lip and the second dust lip.

16. The seal of claim 15, and further comprising a primary sealing lip engaging the rigid member for blocking debris and rotating with respect to the rigid member.

17. A seal comprising:
a casing having an outer-diameter wall that forms an outer radial portion of the casing, an exterior facing wall that forms an axially outermost exterior portion of the casing, the outer-diameter wall having an interior surface, the exterior facing wall having an interior surface, and a chamfered surface between an interior surface of the exterior facing wall and an interior surface of the outer-diameter wall;
a sleeve assembly positioned radially inward from the casing and having at least one dust lip that engages the chamfered surface for blocking debris; and
a primary sealing body positioned radially inward from the casing for blocking debris.

18. The seal of claim 17, wherein the sleeve assembly rotates with respect to the casing.

19. The seal of claim 17, wherein the sleeve assembly rotates with the casing.

20. The seal of claim 17, and further comprising:
a second dust lip combined to the sleeve assembly that engages the interior surface of the exterior facing wall, wherein the dust lip that engages the chamfered surface has an exclusion angle substantially equivalent to the exclusion angle of the second dust lip that engages the interior surface of the exterior facing wall; and
a rigid member combined to the sleeve assembly at least partially surrounded by an elastomeric material, the elastomeric material including the at least one dust lip and the second dust lip; and
wherein the primary sealing body further comprises a primary sealing lip biased into engagement with the rigid member and at least one secondary dust lip spaced axially away from the primary sealing lip to block debris from the primary sealing lip.

21. A seal comprising:
a casing having an outer-diameter wall that forms an outer radial portion of the casing and an exterior facing wall that forms an outer exterior portion of the casing, the outer-diameter wall having an interior surface, the exterior facing wall having an interior surface, and a chamfered surface between the interior surface of the outer-diameter wall and the interior surface of the exterior facing wall;
a sleeve assembly positioned radially inward from the casing for one chosen from rotating with respect to the casing and rotating with the casing; and
the sleeve assembly having at least one dust lip that engages the chamfered surface for blocking debris and a second dust lip combined to the sleeve assembly that engages the interior surface of the exterior facing wall.

22. A seal comprising:
a casing having an outer-diameter wall and an exterior facing wall, the outer-diameter wall having an interior surface, the exterior facing wall having an interior surface, and a chamfered surface between the interior surface of the outer-diameter wall and the interior surface of the exterior facing wall;
a sleeve assembly positioned radially inward from the outer-diameter wall of the casing and axially inward with respect to the exterior facing wall of the casing for one chosen from rotating with respect to the casing and rotating with the casing; and
the sleeve assembly having at least one dust lip axially inward with respect to the exterior facing wall of the casing that engages the chamfered surface for blocking debris.

23. The seal of claim 22, and further comprising a second dust lip combined to the sleeve assembly that engages the interior surface of the exterior facing wall.

* * * * *